Aug. 23, 1949.  A. V. LORD  2,479,947

GENERATOR OF TIME MODULATED PULSES

Filed July 10, 1946  2 Sheets-Sheet 1

Inventor
Arthur V. Lord
By
Emery, Holcombe & Blair
Attorney

Aug. 23, 1949.  A. V. LORD  2,479,947
GENERATOR OF TIME MODULATED PULSES
Filed July 10, 1946  2 Sheets-Sheet 2
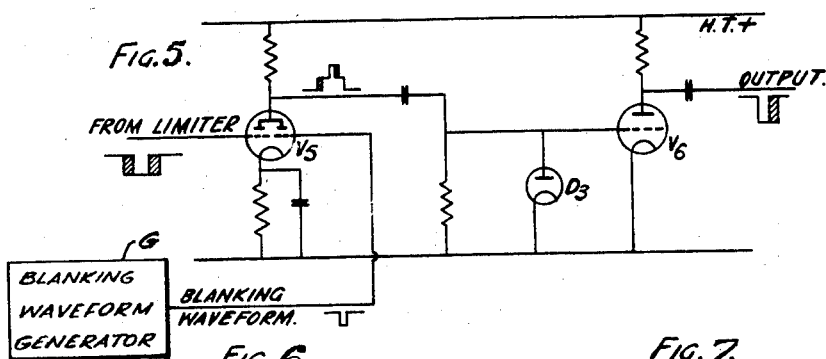
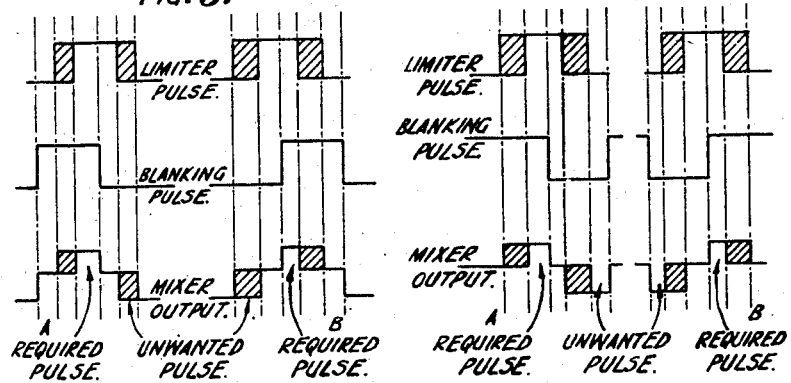
Inventor
Arthur V. Lord
By
Emery, Holcombe &Blair
Attorney Patented Aug. 23, 1949

2,479,947

UNITED STATES PATENT OFFICE 2,479,947

GENERATOR OF TIME MODULATED PULSES

Arthur V. Lord, Cambridge, England, assignor to Pye Limited, Cambridge, England, a British company Application July 10, 1946, Serial No. 682,484
In Great Britain July 17, 1945

7 Claims. (Cl. 332—9)

The present invention relates to a generator of width modulated pulses for signal transmission systems whether the pulses be transmitted over a wire or radio wave. The pulses according to the invention are modulated in width and have one edge fixed in time, the other edge varying with the modulation.

The present invention consists in a generator of width modulated pulses having one edge thereof fixed in time and the other edge variable in accordance with the modulation, comprising means for producing a width modulated pulse train of which both edges of each pulse vary with the modulation, and means for mixing therewith a blanking waveform which blanks out one edge of each modulated pulse and produces a train of width modulated pulses having one edge fixed in time.

In order that the invention may be more clearly understood, reference will now be made, by way of example, to the accompanying drawings, in which—

Fig. 1 above diagrammatically the type of pulses which is generated with the generator according to the present invention.

Fig. 2 shows a block diagram of a generator according to this invention.

Fig. 3 shows a suitable form of modulating circuit.

Fig. 4 shows a pulse forming circuit for producing variable width pulses with both edges carrying the modulation.

Fig. 5 shows a pulse forming circuit for producing variable width pulses with one edge of the pulses remaining fixed.

Figs. 6 and 7 explain the timing of the blanking pulses for producing variable width pulses with the trailing and leading edges fixed respectively.

Figure 1:
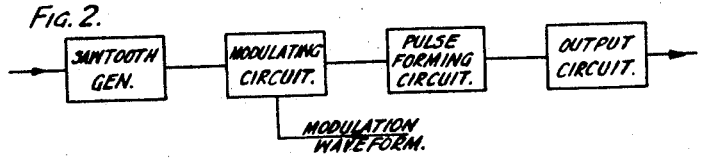
Figure 1:
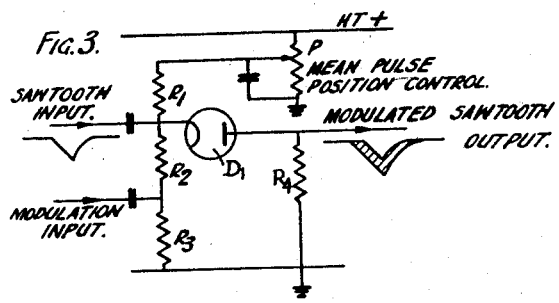
Figure 1:
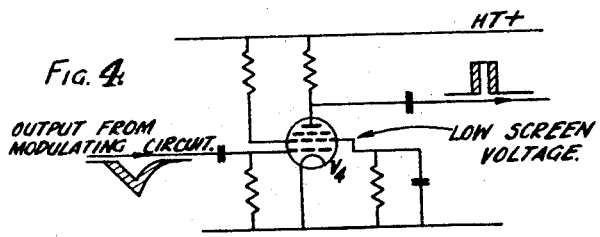

The pulses produced with the generator according to the present invention are modulated in width with one edge of the pulse remaining fixed with reference to the repetition frequency. This is diagrammatically shown in Fig. 1C in which the pulse shown by the unshaded rectangle has its trailing edge fixed in time and its leading edge variable in accordance with the modulation within the area shown shaded. In the converse arrangement, the leading edge may remain fixed and the trailing edge of the pulse be varied.

The modulated pulses are derived from a series of pulses which may conveniently comprise synchronising pulses. The generator, according to this invention, is particularly suited for the generation of time modulated pulses which occur during the periods of wide synchronising pulses such as, for example, exist in the case of sound modulation pulses occurring in the line synchronising intervals of a television waveform in a combined sound and television system as described, for example, in co-pending application Serial Nos. 683,699 filed July 15, 1946, and 703,084 filed October 12, 1946.

Fig. 2 shows a block diagram of a pulse generator according to this invention. The synchronising pulse, for example, the line synchronising pulse of a television waveform, is fed into a saw-tooth generator of any convenient type which generates a saw-tooth of sufficient width to cover the overall time variation required. The output from this saw-tooth generator is fed to a modulating circuit to which the modulation waveform is also applied. This modulating circuit acts as a kind of limiting arrangement, the circuit being triggered at various times in accordance with the applied modulation voltage to vary the base width of the saw-tooth pulses which occur in the output waveform. The output from the modulating circuit is fed to a pulse forming circuit in which the saw-tooth waveform is converted to substantially rectangular pulses which are time modulated.

The output from the pulse forming circuit is fed to an output circuit and to the transmitting arrangement.

Fig. 3 shows a suitable modulating circuit for the saw-tooth output from the saw-tooth generator. This saw-tooth waveform having the form shown at the input to the modulating circuit is fed to the cathode of the diode $D_1$ which is connected to an intermediate point of the resistors $R_1$, $R_2$, $R_3$ as shown. The mean biassing potential of the cathode is adjusted by the variable tapping on the potentiometer P connected across the H. T. supply. The modulating potential is applied between the resistors $R_2$ and $R_3$.

Thus the instant at which the diode $D_1$ conducts varies with the modulation and saw-tooth potentials applied to its cathode, and limited saw-tooth pulses having base width varying in accordance with the modulation appear across the resistor $R_4$ in the anode circuit of the diode $D_1$. The mean pulse position is adjusted by the potentiometer P which is adjusted so that the diode $D_1$ can only conduct during the periods when the negative saw-tooth pulses are applied to its cathode.

The output from the modulating circuit is then fed to a pulse forming circuit.

The output pulse is to be of variable width with one edge of the pulse remaining fixed with reference to the repetition frequency, the functioning of the pulse forming circuit will depend upon whether the leading edge or the trailing edge of the output pulse is to remain fixed. In either case the output of the modulating circuit is limited by an arrangement as shown in Fig. 4, which consists chiefly of the valve V4 operating as a limiter. The output of the limiter valve V4 which consists of substantially rectangular pulses of variable width with both edges of the pulse carrying the modulation is fed to a mixer stage, an example of which is shown in Fig. 5. In the mixer stage, the limiter output, that is a pulse varying in width on both edges, is mixed in the valve V5 with a blanking waveform of suitable width, sign and position. The output of the mixer valve V5 is limited by the restoring diode D3 and the valve V6 as shown and the required output obtained.

If the trailing edge of the output pulse is to remain fixed, a blanking waveform of the same sign must be introduced slightly before the pulse from the limiter valve V4 and the blanking must be removed before the trailing edge of the limiter pulse is reached. The disposition of the pulses is shown at A in Fig. 6. If on the other hand, the leading edge of the output pulse is to remain fixed, a blanking waveform of the same sign must be introduced after the leading edge of the limiter pulse as shown at B in Fig. 6.

The blanking waveform may be obtained by a delayed pulse derived from the main synchronising pulse, or may be generated by a blanking waveform generator G (Fig. 5) such as a relaxation oscillator, or similar device, locked to the synchronising pulse.

If the blanking waveform is of opposite sign to the limiter pulse, the disposition of the pulses shown at A and B in Fig. 6 are reversed as shown at A and B in Fig. 7. The output in this case is also obtained by the limiting of the waveform by an over-driven valve amplifier, the unwanted pulse being limited off.

It will be understood that the circuits described are only examples for obtaining the required waveforms, and that various modifications may be made without departing from the spirit of the invention.

I claim:

1. A generator of width modulated pulses having one edge thereof fixed in time and the other edge variable in accordance with the modulation, comprising means for producing a width modulated pulse train of which both edges of each pulse vary with the modulation, and means for mixing therewith a blanking wave form which blanks out one edge of each modulated pulse and produces a train of width modulated pulses having one edge fixed in time.

2. A generator of width modulated pulses having one edge thereof fixed in time and the other edge variable in accordance with the modulation, comprising means for generating a sawtooth waveform, means for feeding the sawtooth waveform and a modulation signal to a modulating circuit for varying the base length of the sawteeth in accordance with the modulating signal, means for converting the modulated sawtooth to width modulated pulses of substantially rectangular form, means for producing a blanking waveform, and means for mixing the blanking waveform with the width modulated rectangular pulses in such timed relation that one edge of each modulated pulse is blanked out and a width modulated pulse having one edge fixed in time is produced.

3. Generator as claimed in claim 2, wherein the blanking waveform lifts the level of one part of each modulated pulse with reference to the other part thereof, a limiting device being provided for cutting off the unwanted part of the pulse.

4. A generator of width modulated pulses having one edge thereof fixed in time and the other edge variable in accordance with the modulation, comprising means for generating a sawtooth waveform, means for feeding the sawtooth waveform and a modulating signal to a modulating circuit for varying the base length of the sawteeth in accordance with the modulating signal, a limiter for cutting the peaks of the modulated sawteeth so as to produce in the output thereof substantially rectangular pulses of variable width with both edges of the pulses varying with the modulation, means for producing a blanking waveform comprising a series of substantially rectangular pulses occurring at the repetition frequency of the modulated pulses, means for mixing said blanking waveform with the output from the limiter and in such timed relation with the modulated pulses that, in the mixed waveform, a part of the modulated pulse is shifted relative to the other part, the mixed waveform being fed through a further limiting device which cuts off the unwanted part of the mixed waveform and leaves a pulse which is width modulated along one edge only thereof.

5. Generator as claimed in claim 4, wherein the modulating circuit comprises a diode, means for feeding the sawtooth waveform and the modulating signal to the cathode of said diode, and means for applying a constant biassing potential to said cathode.

6. Generator as claimed in claim 5, wherein means are provided for adjusting said biassing potential.

7. A transmitter for a combined sound and television waveform in which the sound is transmitted as a series of width modulated pulses having one edge thereof fixed in time and the other edge variable in accordance with the modulation, said modulated pulses occurring during the line synchronising periods, comprising means for generating a television waveform comprising picture intelligence and line synchronising pulses, means controlled by said line synchronising pulses for generating a sawtooth waveform, means for feeding the sawtooth waveform and a sound modulating signal to a modulating circuit for varying the base length of the sawteeth in accordance with the modulating signal, a limiting device for cutting the peaks of the modulated sawteeth so as to produce in the output thereof substantially rectangular pulses of variable width with both edges of the pulses varying with the modulation, means for producing a series of substantially rectangular blanking pulses occurring at the repetition frequency of the modulated pulses and delayed in time with respect to the line synchronising pulses, means for mixing the blanking pulses with the output from the limiting device and in such timed relation with the modulated pulses that a part of the modulated pulse is shifted relative to the other part, the mixed modulated and blanking pulses being fed through a further limiting device which cuts off the unwanted part of the modulated pulses and leaves pulses which are width modulated along one edge only thereof, and means for mixing said width modulated pulses which are modulated along one edge only thereof with the picture intelligence and the line synchronising signals with the width modulated pulses occurring during the line synchronising periods in the composite waveform.

ARTHUR V. LORD.

REFERENCES CITED

The following references are of record in the file of this patent:

UNITED STATES PATENTS

| Number | Name | Date |
|---|---|---|
| 2,280,707 | Kell | Apr. 21, 1942 |
| 2,419,535 | Chatterjea | Apr. 29, 1947 |